(12) United States Patent
Steudle

(10) Patent No.: US 6,810,019 B2
(45) Date of Patent: Oct. 26, 2004

(54) REDUCING INTERFERENCE IN INTER-FREQUENCY MEASUREMENT

(75) Inventor: Ville Steudle, Turku (FI)

(73) Assignee: Nokia Mobile Phones Ltd., Espoo (FI)

( * ) Notice: Subject to any disclaimer, the term of this patent is extended or adjusted under 35 U.S.C. 154(b) by 754 days.

(21) Appl. No.: 09/782,360

(22) Filed: Feb. 13, 2001

(65) Prior Publication Data

US 2001/0022782 A1 Sep. 20, 2001

(30) Foreign Application Priority Data

Feb. 18, 2000 (FI) .............................................. 20000380

(51) Int. Cl.⁷ .............................. H04Q 7/38; H04B 7/26
(52) U.S. Cl. ........................ 370/252; 370/336; 455/423
(58) Field of Search ................................ 370/252, 332, 370/336, 345; 455/423, 522

(56) References Cited

U.S. PATENT DOCUMENTS

| | | | | |
|---|---|---|---|---|
| 5,883,899 | A | | 3/1999 | Dahlman et al. ............ 370/468 |
| 6,694,135 | B1 | * | 2/2004 | Oksala et al. ................ 455/424 |
| 2001/0008521 | A1 | * | 7/2001 | Virtanen ..................... 370/331 |
| 2002/0006119 | A1 | * | 1/2002 | Steudle ....................... 370/329 |
| 2003/0026235 | A1 | * | 2/2003 | Vayanos et al. ............. 370/342 |
| 2003/0103473 | A1 | * | 6/2003 | Warich et al. ............... 370/318 |
| 2003/0108027 | A1 | * | 6/2003 | Kim et al. ................... 370/345 |
| 2003/0193969 | A1 | * | 10/2003 | Pecen et al. ................. 370/509 |
| 2003/0207696 | A1 | * | 11/2003 | Willenegger et al. ....... 455/522 |
| 2004/0116110 | A1 | * | 6/2004 | Amerga et al. ........... 455/422.1 |

FOREIGN PATENT DOCUMENTS

EP 1020999 A1 7/2000

OTHER PUBLICATIONS

"RRC Connection Mobility", 3G TR 25.922, version 3.0.0., chapter 5, relevant pages.

* cited by examiner

Primary Examiner—Melvin Marcelo
(74) Attorney, Agent, or Firm—Perman & Green, LLP (57) ABSTRACT

A method for defining measurement gaps in a wireless telecommunications system comprising at least one base station and several wireless terminals. The telecommunications system comprises defining measurement patterns for terminals, which measurement patterns set locations of gaps used for measurements in a time-slot frame, and the base station comprises a transmitter for transmitting the measurement patterns to the corresponding terminals. In the method, measurement patterns are defined for the terminals, setting the locations of the gaps used for measurements in a time-slot frame, the measurement patterns are transmitted through the base station to the corresponding terminals and various delays are defined for the measurement patterns of the terminals so that the gaps of different terminals are in substantially different locations in the time-slot frame.

15 Claims, 5 Drawing Sheets

| | parametres not optimised | | | | parametres optimised | | | |
|---|---|---|---|---|---|---|---|---|
| UE number | 1 | 2 | 3 | 4 | 1 | 2 | 3 | 4 |
| CFN (frame no.) | 1 | 1 | 1 | 1 | 1 | 1 | 1 | 2 |
| TGSN (slot no.) | 4 | 4 | 4 | 4 | 0 | 8 | 4 | 4 |
| TGL1 (slots) | 7 | 7 | 7 | 7 | 7 | 7 | 7 | 7 |
| TGPL1/2 (frames) | 1 | 1 | 2 | 2 | 1 | 1 | 2 | 2 |
| frame 1 (gap: slot - slot) | 4 -10 | 4 -10 | 4 -10 | 4 -10 | 0 - 6 | 8 - 14 | 4 - 10 | - |
| frame 2 (gap: slot - slot) | 4 -10 | 4 -10 | - | - | 0 - 6 | 8 - 14 | - | 4 - 10 |
| frame 3 (gap: slot - slot) | 4 -10 | 4 -10 | 4 -10 | 4 -10 | 0 - 6 | 8 - 14 | 4 - 10 | - |

|          | TGL1/2 | TGD   | TGPL1 | TGPL2    | TGPRC |
|----------|--------|-------|-------|----------|-------|
| Pattern1 | 7      | 24/15 | 4     | 20       | M     |
| Pattern2 | 7      | 24/15 | 4     | 140      | M     |
| Pattern3 | 7      | 2     | 4     | Not Used | M     |
| Pattern4 | 7      | 2     | 4     | 20       | M     |
| Pattern5 | 7      | 2     | 4     | 140      | M     |
| Pattern6 | 14     | 3     | 6     | 18       | M     |
| Pattern7 | 14     | 3     | 6     | 138      | M     |

Fig. 4A (Prior Art)

|          | TGL1/2 | TGD | TGPL1 | TGPL2    | TGPRC |
|----------|--------|-----|-------|----------|-------|
| Pattern8 | 7      | 0   | 72    | Not Used | M     |
| Pattern9 | 7      | 0   | 144   | Not Used | M     |

Fig. 4B (Prior Art)

|  | parametres not optimised | | | | parametres optimised | | | |
|---|---|---|---|---|---|---|---|---|
| UE number | 1 | 2 | 3 | 4 | 1 | 2 | 3 | 4 |
| CFN (frame no.) | 1 | 1 | 1 | 1 | 1 | 1 | 1 | 2 |
| TGSN (slot no.) | 4 | 4 | 4 | 4 | 0 | 8 | 4 | 4 |
| TGL1 (slots) | 7 | 7 | 7 | 7 | 7 | 7 | 7 | 7 |
| TGPL1/2 (frames) | 1 | 1 | 2 | 2 | 1 | 1 | 2 | 2 |
| frame 1 (gap: slot - slot) | 4 -10 | 4 -10 | 4 -10 | 4 -10 | 0 - 6 | 8 - 14 | 4 - 10 | - |
| frame 2 (gap: slot - slot) | 4 -10 | 4 -10 | - | - | 0 - 6 | 8 - 14 | - | 4 - 10 |
| frame 3 (gap: slot - slot) | 4 -10 | 4 -10 | 4 -10 | 4 -10 | 0 - 6 | 8 - 14 | 4 - 10 | - |

REDUCING INTERFERENCE IN INTER-FREQUENCY MEASUREMENT

BACKGROUND OF THE INVENTION

1. Field of the Invention

The invention relates to measuring inter-frequencies in a mobile telephone system employing frequency division duplex (FFD) and especially to optimising said measurements with respect to the total output in a system employing code division multiple access (CDMA).

2. Brief Description of Related Developments

Third-generation mobile telephone systems called UMTS (Universal Mobile Telephone System) and IMT-2000 (International Mobile Telephone System), for instance, will use wideband code division multiple access technology, i.e. WCDMA technology, on the radio path. In a WCDMA system, all mobile stations in a cell use the same frequency between each other on the transmission link from the mobile station to the base station and correspondingly, the same frequency between each other on the transmission link from the base station to the mobile station. A WCDMA system can in mobile telephone systems be implemented either as frequency division duplex (FDD) or time division duplex (TDD).

In an FDD-type WCDMA system, the uplink direction (from the mobile station to the base station) and the downlink direction (from the base station to the mobile station) transmissions are independent of each other. Thus, the base stations need not be synchronized with respect to each other, either. It is, however, typical of CDMA systems that a downlink transmission is performed simultaneously from several base stations to one mobile station, which transmission the receiver of the mobile station is arranged to receive. This arrangement is called a soft handover, and to control it, the mobile station must perform various parameter measurements for both uplink and downlink connections. Corresponding measurements are also used in updating the location of a mobile station and in handovers between WCDMA and GSM systems.

The receiver of a mobile station is typically arranged to receive only one frequency at a time, which means that one set of receiving means is enough for the mobile station and there is no need to design antenna diversity to them, which is advantageous both in view of cost and making the structure of the mobile station simple. The mobile station can also be designed to comprise several receiving means (dual receiver), which usually include antenna diversity. This type of mobile station is, however, more expensive and complex to implement.

Thus, the parameter measurements described above can be performed in a typical one-receiver mobile station only when there is no transmission. This also applies to dual-receiver mobile stations when one set of transmission/reception means transmits on almost the same frequency as a second set of transmission/reception means performs measurements. In an FDD-type WCDMA system, the transmission is interrupted for a while by generating in a frame a gap during which transmission is interrupted. This is done by using what is known as compressed mode or slotted mode in which information normally transmitted in a 10-ms frame is transmitted in a shorter time. Since the same information is transmitted in a shorter time, a gap remains in the frame, during which measurements of the parameters described above can then be performed. Depending on the measurement situation and the transmitter properties, compressed mode is only used in uplink or downlink transmissions, or a combined uplink/downlink compressed mode can also be used.

In CDMA systems, all mobile stations connected to a certain cell typically use the same frequency bands in uplink and downlink transmissions, which means that the transmissions of various mobile stations and base stations cause interference to each other. In addition, due to the signal propagation mechanism, signals transmitted from a mobile station close to a base station arrive at the base station stronger than those transmitted with the same power but further away from the base station, i.e. what is known as a near-far effect takes place. To maximize the capacity of a CDMA system in relation to the radio interface, it is essential that signals arriving at the base station have substantially the same average power, i.e. signal-to-interference ratio (SIR). Owing to this, CDMA systems are characterized by a fast but complex transmission power control method.

In the compressed mode described above, a certain amount of data to be transmitted is compressed to be transmitted in a shorter time, in which case the transmission power must be momentarily increased to maintain a constant signal-to-interference ratio. Increasing the transmission power then also causes interference to the transmissions of mobile stations in the same cell, and they, too, need to increase their transmission power to compensate for the interference.

A problem with the above arrangement is that the present WCDMA system does not define where in a time division frame compressed mode is used, in other words, where in the frame a gap is generated for measuring parameters. Thus, the gaps may randomly fall anywhere in the frame. If in several mobile stations, the gap falls into substantially the same place, the compressed places in which transmission power has been increased, also overlap at least partly. The total interference in the system then increases and the average transmission power of the mobile stations must be increased. Further, increasing the transmission power may cause an uncontrolled state in which all mobile stations increase their transmission power to its maximum, whereby the capacity limit of the system is reached and the quality of the transmissions decreases. Because the base station, too, typically transmits at the same frequency as the mobile stations, the downlink direction transmission power must also be increased.

SUMMARY OF THE INVENTION

In one embodiment, the present invention is directed to a method for defining measurement gaps in a wireless telecommunications system comprising one base station and several wireless terminals, the method comprising: defining for the terminals in said telecommunications system measurement patterns which define locations of gaps used for measurements in a time-slot frame, and sending the measurement patterns to the corresponding terminals through the base station. The method is characterized in that various delays are defined for the measurement patterns of said terminals so that the gaps of different terminals are in substantially different locations in the time-slot frame.

The invention also relates to a wireless telecommunications system comprising a fixed network, at least one base station and several wireless terminals and means for defining measurement patterns for terminals, which measurement patterns define locations of gaps used in measurements in a time-slot frame and which base station comprises a transmitter for transmitting the measurement patterns to the corresponding terminals. The telecommunications system is characterized in that said means for defining measurement patterns are arranged to define various delays for said terminal measurement patterns so that the gaps of different terminals are in substantially different locations in the time-slot frame.

The invention further relates to a terminal in a wireless telecommunications system, which terminal comprises a receiver for receiving measurement pattern definitions defined by the telecommunications system and processing means for arranging gaps in a time-slot frame according to the measurement pattern definitions, and which is characterized in that said processing means are also arranged to set for the measurement pattern a delay according to the measurement pattern definitions.

The invention also relates to a base station in a wireless telecommunications system, to which base station means are operationally connected for defining measurement patterns for terminals, which measurement patterns define locations of gaps used in measurements in the time-slot frame and which base station comprises a transmitter for transmitting the measurement patterns to the terminals. The base station is characterized in that said means for defining measurement patterns operationally connected to said base station are arranged to define various delays for said terminal measurement patterns so that the gaps of different terminals are in substantially different locations in the time-slot frame.

The invention is based on the idea that to make measurements, especially those performed in compressed mode, non-simultaneous, at least partly different delays are set for the measurement patterns defining the measurement gaps of each mobile station, whereby time-slots also transmitted in compressed mode at a higher data rate are distributed more evenly to various mobile stations in relation to the time-slot frame.

The method and system of the invention provides the advantage that by optimizing the distribution of the measurement gaps between various mobile stations, the interference caused by mobile stations to each other at a higher transmission power is reduced. This provides the further advantage that the average transmission power of the system remains low, thus improving the capacity of the system.

BRIEF DESCRIPTION OF THE FIGURES

In the following, the invention will be described in greater detail by means of preferred embodiments and with reference to the attached drawings, in which.

DETAILED DESCRIPTION OF THE INVENTION

The invention can be used in all wireless telecommunications systems needing total transmission power control on the uplink transmission path, especially for distributing uplink transmissions and interference of terminals evenly in relation to time. The method of the invention can also be applied to decreasing the transmission power of a downlink transmission path. The examples describe the use of the invention in a universal mobile telephone system employing wideband code division multiple access, without, however, limiting the invention to it.

Figure 1:
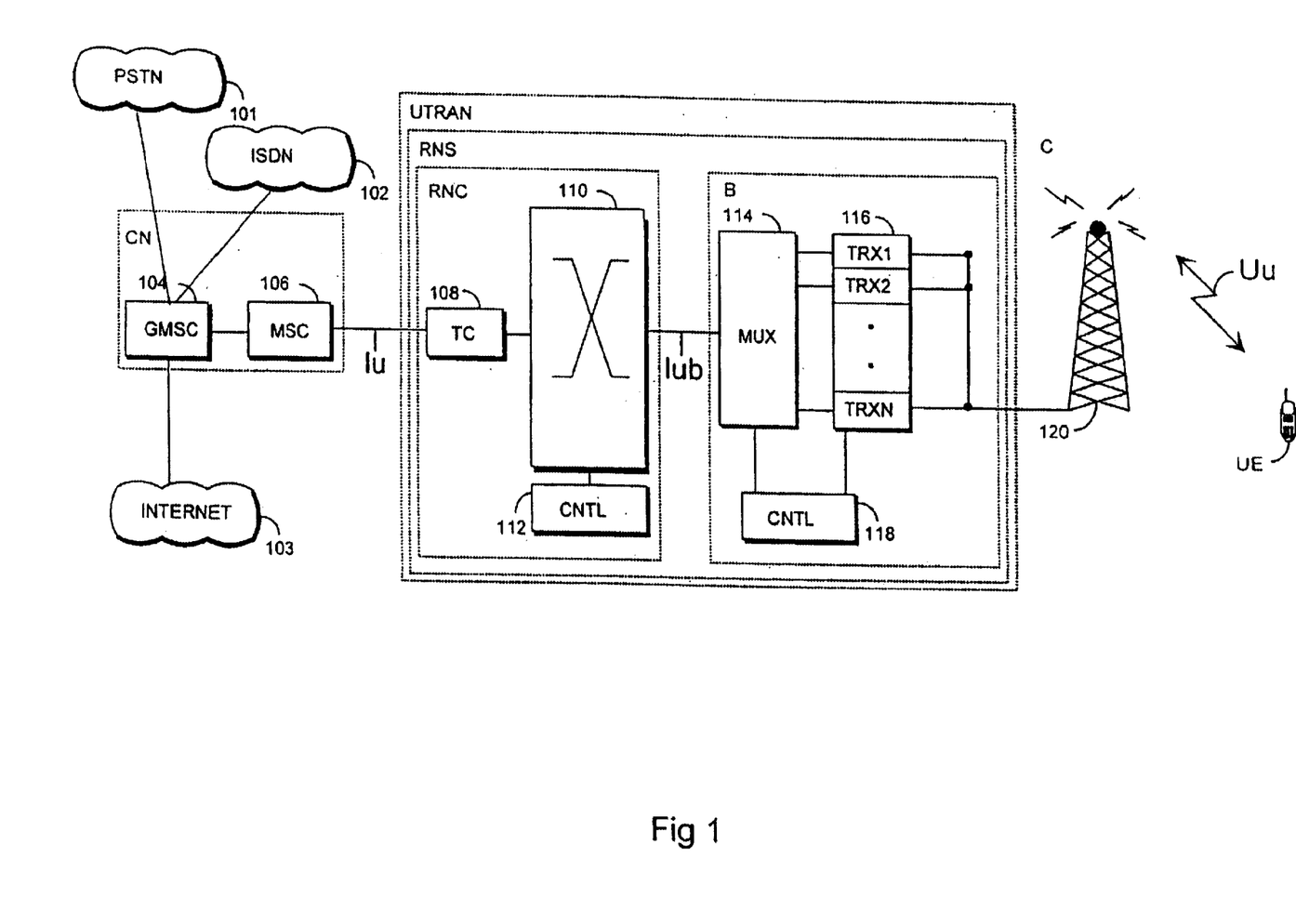
FIG. 1 shows the structure of an UMTS mobile telephone system in a simplified block diagram.

The structure of an UMTS mobile telephone system is described with reference to FIG. 1. FIG. 1 only contains the blocks essential for explaining the invention, but it is obvious to a person skilled in the art that a conventional mobile telephone system also comprises other functions and structures, which need not be described in greater detail herein. The main parts of a mobile telephone system are a core network CN, a UMTS mobile telephone system terrestrial radio access network UTRAN, and a mobile station or user equipment UE. The interface between CN and UTRAN is referred to as Iu and the air interface between UTRAN and UE is referred to as Uu.

UTRAN typically comprises radio network subsystems RNS, the interface between the RNSs being referred to as Iur (not shown). A radio network subsystem RNS comprises a radio network controller RNC and one or more nodes B. The interface between RNC and B is referred to as Iub. The service area, i.e. cell, of node B is indicated with C in FIG. 1.

The user equipment UE can, for instance, be a fixed or a portable terminal or one installed in a vehicle. The infrastructure UTRAN of the radio network comprises radio network subsystems RNS, i.e. base station systems. The radio network subsystem RNS comprises a radio network controller RNC, i.e. a base station controller, and at least one node B, i.e. base station, under its control.

The base station B has a multiplexer 114, transceivers 116 and a control unit 118 which controls the operation of the transceivers 116 and the multiplexer 114. With the multiplexer 114, the traffic and control channels used by several transceivers 116 are placed in the transmission link Iub.

The transceivers 116 of the base station B are connected to an antenna unit 120 with which a bi-directional radio link Uu is implemented to the user equipment UE. The structure of the frames being transmitted over the bi-directional radio link Uu is clearly specified.

The radio network controller RNC comprises a group switching field 110 and a control unit 112. The group switching field 110 is used for speech and data connection and to connect signalling circuits. The base station system formed by the base station B and the radio network controller RNC also comprises a transcoder 108. Distribution of tasks between the radio network controller RNC and the base station B as well as their physical structure can vary depending on implementation. Typically, the base station B takes care of the radio path implementation as described above. The radio network controller RNC typically takes care of the following: management of radio resources, control of handover between cells, power adjustment, timing and synchronization, paging the subscriber terminal.

The transcoder 108 is usually located as close as possible to a mobile switching centre 106, because speech can then be transmitted in mobile telephone system format between the transcoder 108 and the radio network controller RNC, saving transmission capacity. The transcoder 108 converts the different digital coding formats of speech used between the public switched telephone network and the mobile telephone network to be compatible with each other, for instance from the 64 kbit/s format of a public network to another (e.g. 13 kbit/s) format of a cellular network and vice versa. The hardware required is not described in detail herein, but it should be noted that other data than speech is not converted in the transcoder 108. The control unit 112 takes care of call control, mobility management, collection of statistics, and signalling.

The core network CN comprises an infrastructure belonging to a mobile telephone system and external to UTRAN. FIG. 1 describes two of the components in a core network CN, i.e. a mobile switching centre 106 and a gateway mobile switching centre 104 which handles the connections of the mobile telephone system to the outside world, such as to a public analogue telephone network (PSTN, public switched telephone network) 101 or a digital telephone network (ISDN, integrated services digital network) 102 or to the Internet 103. It should be noted that the UMTS system is designed so that the core network CN can be identical with that of the GSM system, thus making it unnecessary to rebuild the entire network infrastructure.

Figure 2:
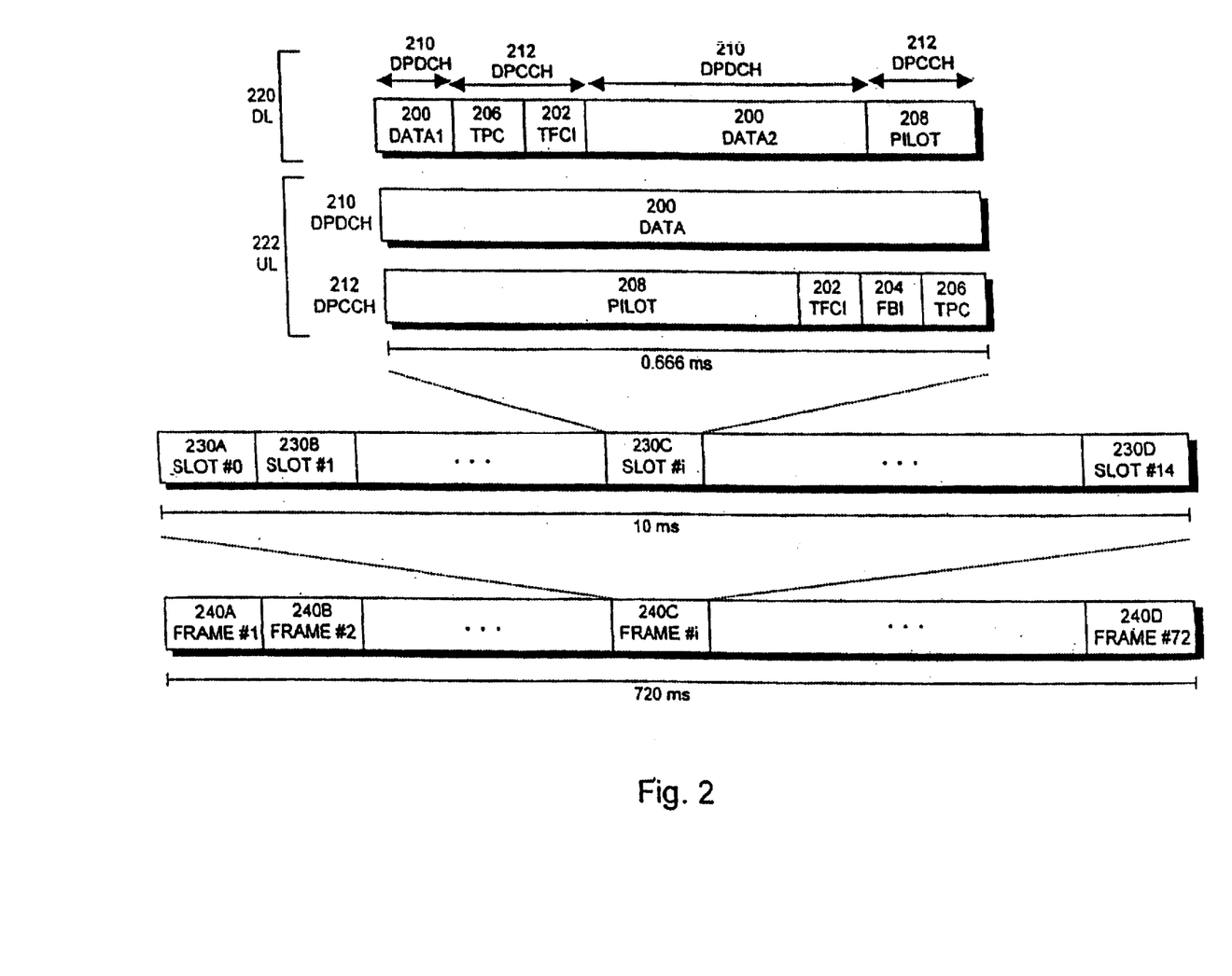
FIG. 2 shows a frame structure used on the radio link of a WCDMA system.

FIG. 2 shows the frame structure of an FDD-type WCDMA system in a physical channel. Frames 240A, 240B, 240C, 240D are numbered sequentially from 1 to 72, and they form a 720-millisecond long super frame. The length of this super frame is a multiple of the multi-frame of the GSM system (6×120 ms) which, for its part, makes it possible to use the GSM core network in a WCDMA system. The length of one frame 240 is 10 milliseconds. Frame 240 is divided into fifteen (0 to 14) slots 230A, 230B, 230C, 230D. The length of one slot 230C is 2560 chips, i.e. 0.666 milliseconds. One slot 230 typically corresponds to one power adjustment period during which power is adjusted one decibel up or down, for instance.

Physical channels are divided into two groups: common physical channels and dedicated physical channels.

The following transport channels are transmitted in the common physical channels: PCH (paging channel), BCH (broadcast channel, RACH (random access channel) and FACH (forward access channel).

Dedicated physical channels comprise dedicated physical data channels (DPDCH) 210 and dedicated physical control channels (DPCCH) 212. Dedicated physical data channels 210 are used to transmit dedicated control channels, i.e. data 200 which is generated on the second layer of OSI (Open Systems Interconnection) and above. Dedicated physical control channels 212 transmit control information generated on the first layer of OSI. Control information comprises at least pilot bits 208 used in channel estimation, feedback information (FBI) 204, transmit power control commands (TPC) 206, and optionally a transport format combination indicator (TFCI) 202. The transport format combination indicator 202 indicates to the receiver the transmission formats of the different transport channels, i.e. the transport format combination, used in the frame in question.

As shown in FIG. 2, on the downlink, the dedicated physical data channels 210 and the dedicated physical control channels 212 are time-multiplexed to the same slot 230C. However, on the uplink, the channels in question are transmitted parallel so that they are IQ/code-multiplexed to each frame 240C.

Figure 3:
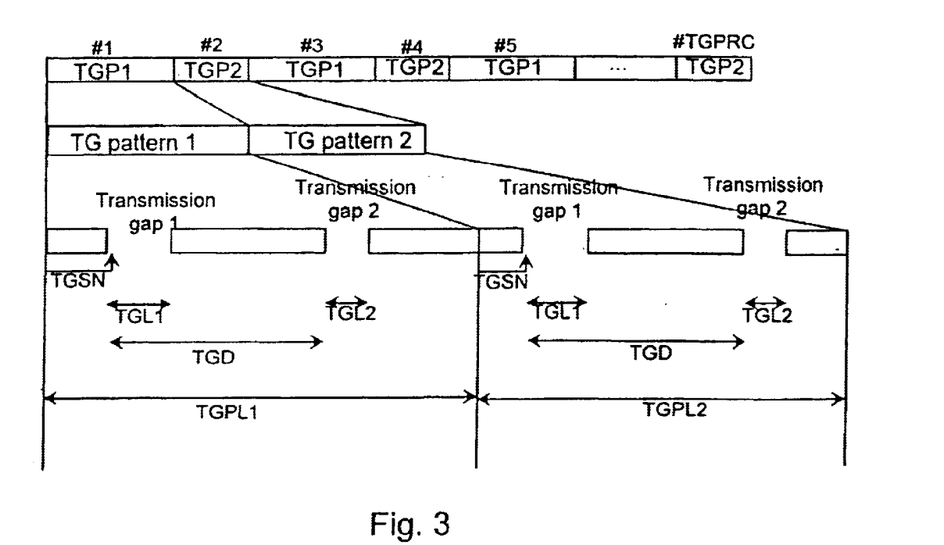
FIG. 3 illustrates some parameters used in defining compressed mode.

FIG. 3 shows parameters relevant to the invention, which are used in defining compressed mode in an FDD-type WCDMA system. A connection frame number (CFN) defines the number of the time division frame in which the application of the compressed mode is started. In other words, CFN defines the frame into whose time-slot(s) a gap is left for measuring inter-frequency parameters. A transmission gap starting slot number (TGSN) defines the time-slot of the 15 time-slots in the frame in question, from which the gap starts. Transmission gap length 1/2 (TGL1/2) defines how long the gap is as a number of time-slots, in other words, it defines the length of time during which transmission is interrupted at one time. Transmission gap distance (TGD) is the distance between two consecutive gaps indicated as a number of time-slots. Transmission gap pattern length 1/2 (TGPL1/2) defines the number of consecutive frames which comprise one or two gaps. Sequences of transmission gap pattern lengths are repeated until the required measurement has been made. The total time of measurement is defined as a transmission gap period repetition count (TGPRC), which is indicated as a number of frames and typically comprises several gap patterns. It should be noted that other parameters, too, are used in compressed mode definition, but a more detailed description of them is not essential for the invention.

The performance of the measurements is typically defined by means of the parameters TGL1/2, TGPL1/2, TGD and TGPRC. The parameters CFN and TGSN are used in some measurements to only define the delay to be used, which is typically a measurement pattern-specific constant value for all mobile stations. For instance, for an internal (inter-frequency) handover of a WCDMA system, the fixed network UTRAN requests user equipment UE to perform inter-frequency parameter measurements. The fixed network UTRAN then signals to the user equipment UE monitoring settings for the handover and the compressed mode parameters to be used for the required measurements. In the preparations for an internal (inter-frequency) WCDMA system handover, compressed mode can further be divided into two operational modes, selection mode and re-selection mode. During selection mode, the user equipment UE must identify the cell to which the handover will be made. During re-selection mode, the user equipment UE measures the strength of the signal transmitted by the base station BTS of said cell.

Figure 4A:
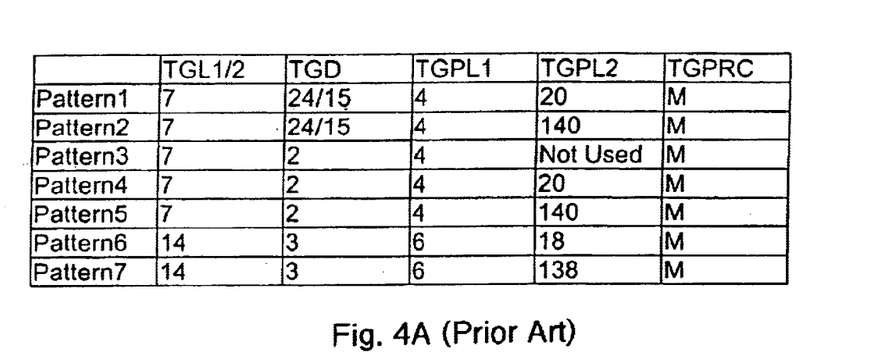
FIGS. 4a and 4b show some measurement pattern definitions according to prior art.
Figure 4B:
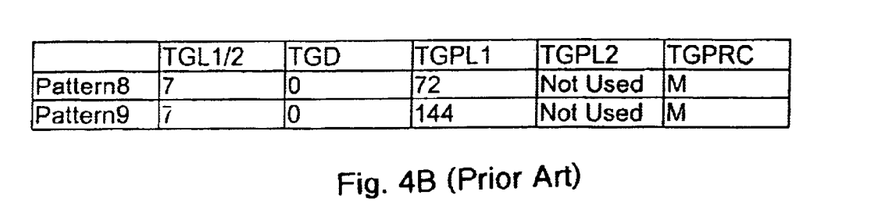

The tables in FIGS. 4a and 4b show some compressed mode measurement parameters signalled by the fixed network UTRAN to the user equipment UE for the selection mode and correspondingly, for the re-selection mode. For the selection mode measurements, FIG. 4a shows seven alternative measurement patterns of which the fixed network UTRAN then selects one and signals it to the user equipment UE to define the measurements of the parameters. The measurement pattern used at each time is selected on the basis of the measurement to be performed, in other words, what different measurements the mobile station should perform. The user equipment UE performs measurements during gaps whose length (TGL1) is either 7 or 14 time-slots and on the basis of the measurements, the user equipment UE reports to the fixed network for instance the timing of the frame, the scrambling code used and the chip energy ($E_c/I_o$) of the primary common control physical channel (CCPCH) in the downlink direction. As shown in FIG. 4a, the measurement parameters TGL1, TGD and TGPL1 of measurement patterns 1 and 2, also 3, 4 and 5, and 6 and 7 are similar to each other. When allocating measurement patterns to several mobile stations, it is then probable that the gaps fall on several mobile stations at least partly simultaneously. Then the compressed parts, too, whose transmission power has been increased, overlap at least partly, which results in an increase in the total interference and in increasing the average transmission power of the mobile stations. The user equipment UE uses the gap period parameters TGPL1 and TGPL2 one after the other, but even then the gaps overlap at least partly in the measurement patterns 1 and 4, and 2 and 5, for instance.

The re-selection mode measurement patterns 8 and 9 described in FIG. 4b are used when the user equipment UE knows the scrambling code used in the new cell. Again, the fixed network UTRAN allocates either of the measurement patterns 8 or 9 to the user equipment UE depending on the situation. Since there are only two alternatives and since the measurement pattern 9 definitions are multiples of the measurement pattern 8 (2×72=144), whereby every second gap falls in the same place with respect to the measurement patterns 8 and 9, it is again highly probable that the gaps defined for mobile stations in the same cell overlap at least partly.

The above describes measurements performed for an internal (inter-frequency) WCDMA system handover as one example of a parameter measurement typical of the WCDMA system in compressed mode. It should be noted that the 3GPP specification also defines in a corresponding manner other parameter measurements in compressed mode, in which problems described above are also encountered.

For a more detailed description of these measurements, reference is made to the document 3G TR 25.922, version 3.0.0., chapter 5, "RRC Connection Mobility".

In the following, a preferred embodiment of the invention is described by means of an example and with reference to FIG. 5. As stated above, the parameters CFN and TGSN are not typically used in defining measurements performed in compressed mode other than by setting the same measurement delay for all mobile stations of a cell. The fixed network UTRAN, however, signals the parameters CFN and TGSN to the user equipment UE in any case, since they are needed in forming the radio link frame structure. This makes possible the use of said parameters for minimising interference without extra signalling. Instead of setting the same delay for all mobile stations UE, the fixed network UTRAN can preferably allocate different values for the parameters CFN and TGSN for each mobile station within the limits defined by a maximum delay. Then the parameter TGSN, which defines the time-slot from which the gap starts, can, depending on the measurement pattern, preferably obtain values 0 to 14 covering all time-slots in the time-slot frame. The parameter CFN, which defines the frame from which the gap starts, can preferably also vary within the scope of the maximum delay defined for the system. The allocation of the parameters CFN and TGSN for mobile stations can be optimised so that in compressed mode the time-slots transmitted at a higher data rate are distributed as evenly as possible to different mobile stations. Then the average transmission power and the interference among the mobile stations can preferably be kept as low as possible, thus improving the output and capacity of the system.

Figure 5:
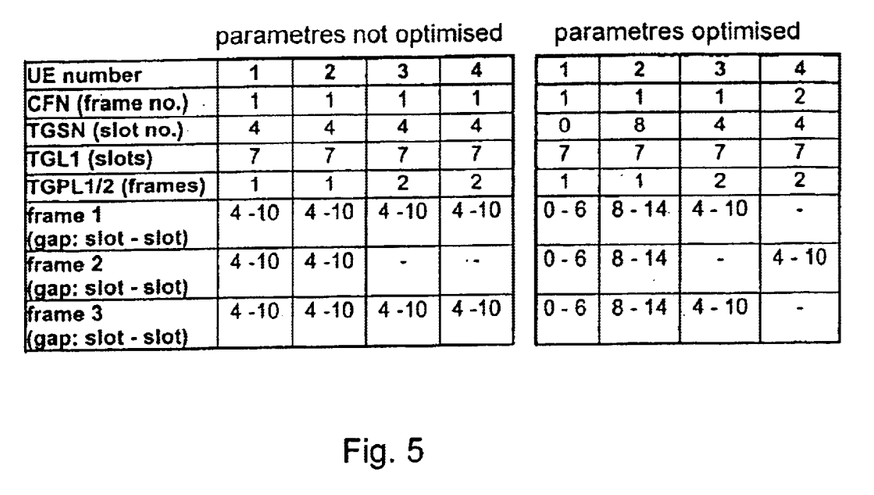
FIG. 5 shows a comparison between prior art measurement pattern definitions and those of the invention in a table.

The table in FIG. 5 shows by way of example the defining of measurement parameters for four mobile stations both according to prior art, in which the parameters are not optimised (table on the left), and according to the invention, in which the parameters are optimised especially by means of the parameters CFN and TGSN (table on the right). In the table on the left, the same delay is defined according to prior art to user equipment (UE number) UE1, UE2, UE3 and UE4 by giving the parameters CFN and TGSN of each mobile station the values 1 and 4 respectively. The gap length TGL1 is seven time-slots in each mobile station. The gap pattern length is one time-slot frame in the user equipment UE1 and UE2, and two time-slot frames in the user equipment UE3 and UE4. In addition, the table shows for the three first frames (frame 1, 2, 3) of the measurement period TGPRC, the time-slots into which the gaps fall in each frame with these definitions. The table shows that during the first frame, in all four user equipment, the gap falls in the same location, i.e. time-slots 4 to 10, in other words, in compressed mode the time-slots transmitted at a higher data rate also fall in the same location, i.e. time-slots 0 to 3 and 11 to 14, in all four user equipment. During the second frame, the gaps in the user equipment UE1 and UE2 fall in the same time-slots 4 to 10, but no gaps are defined for the user equipment UE3 and UE4 for the second frame, because their gap period definition TGPL1 is two time-slot frames. In the third frame, even all four user equipment again have a gap during time-slots 4 to 10. Thus, in the prior art situation of the above example, all four user equipment transmit at a higher data rate and power simultaneously.

In the table on the right, different delays are preferably defined according to the invention to the user equipment UE1, UE2, UE3 and UE4 by defining differing values for the parameters CFN and TGSN of each user equipment. For comparison with the solution of prior art, the same measurements are also shown in the table on the right as in the table on the left, and the gap length TGL1 is seven time-slots in all user equipment, and the gap pattern length is one time-slot frame for the user equipment UE1 and UE2 and two time-slot frames for the user equipment UE3 and UE4 as in the table on the left. The user equipment UE1, UE2 and UE3 are set to start measuring from the first frame (CFN=1), here, however, different values for the parameter TGSN, which defines the time-slot in the frame, from which the gap starts, are preferably set for each user equipment. The parameter TGSN of user equipment UE1 obtains the value 0, UE2 obtains the value 8 and UE3 obtains the value 4. Further, the user equipment UE4 is set to start measuring from the second frame (CFN=2), in time-slot four (TGSN=4). The table on the right, too, shows the first three frames of the measurement period TGPRC and the time-slots to which the gaps fall in each frame with these definitions. The table shows that during the first frame, the gap falls in time-slots 0 to 6 in the user equipment UE1, in time-slots 8 to 14 in UE2 and in time-slots 4 to 10 in UE3. The user equipment UE4 does not have a gap in the first frame, because the measuring only starts in the second frame (CFN=2). Thus, in the first frame in the compressed mode of the user equipment UE1, the time-slots transmitted at a higher data rate are in time-slots 7 to 14, in the second user equipment UE2 in time-slots 0 to 7 and in the third user equipment in time-slots 0 to 3 and 11 to 14. It should also be noted that when using halving of spreading factor and discontinuous transmission (DTX), the last time-slot before the gap and/or the first time-slot after the gap are partially empty and during them, the transmitter is typically switched off. Thus, the overlap falling on time-slot 7 of both UE1 and UE2 does not cause an overlapping transmission. Therefore, by suitably varying the parameters CFN and TGSN, a situation can be reached where during the first frame at most only two user equipment transmit simultaneously at a higher data rate and power.

During the second frame, the gaps in the user equipment UE1 and UE2 fall into the same time-slots as in the first frame, but no gaps are defined for the user equipment UE3 in the second frame, because its gap pattern length definition TGPL1 is two time-slot frames. Instead, setting the parameter CFN of the user equipment UE4 to 2 and the parameter TGSN to 4 places the gap of the user equipment UE4 in the second frame to a location corresponding to that which the user equipment UE3 gap has in the first frame. Thus, during the second frame, too, at most two user equipment transmit simultaneously at a higher data rate and power. The third frame matches the situation in the first frame, the fourth frame matches that in the second, and so on. Thus, in accordance with the above example, the parameters CFN and TGSN can be suitably changed so that for each compressed mode measurement, it is possible to define an optimal situation with respect to the total transmission power and interference in the system, in which as few units of user equipment as possible transmit simultaneously at a higher data rate and power.

It should be noted that the above only constitutes a simplified example illustrating the invention. The invention can be applied to most compressed mode measurements, such as the various measurement patterns shown in FIGS. 4a and 4b. Then, especially the different settings of the parameters TGL1/2 and TGPL1/2 and the varying number of mobile stations must naturally be taken into account case by case when defining the parameters CFN and TGSN for each mobile station. In practice, the definition of the parameters CFN and TGSN can be made on the basis of an algorithm or lookup table configured for the purpose, based on which the fixed network UTRAN allocates the parameters for the mobile stations case by case.

It should also be noted that even though the above describes measurements performed for an internal (inter-frequency) WCDMA system handover as one example of parameter measurement in compressed mode, the measurement gaps defined according to the invention are not limited to measurements made in WCDMA or GSM systems only. Any measurements, such as location positioning by means of the global positioning system, can be performed during the gaps.

Figure 6:
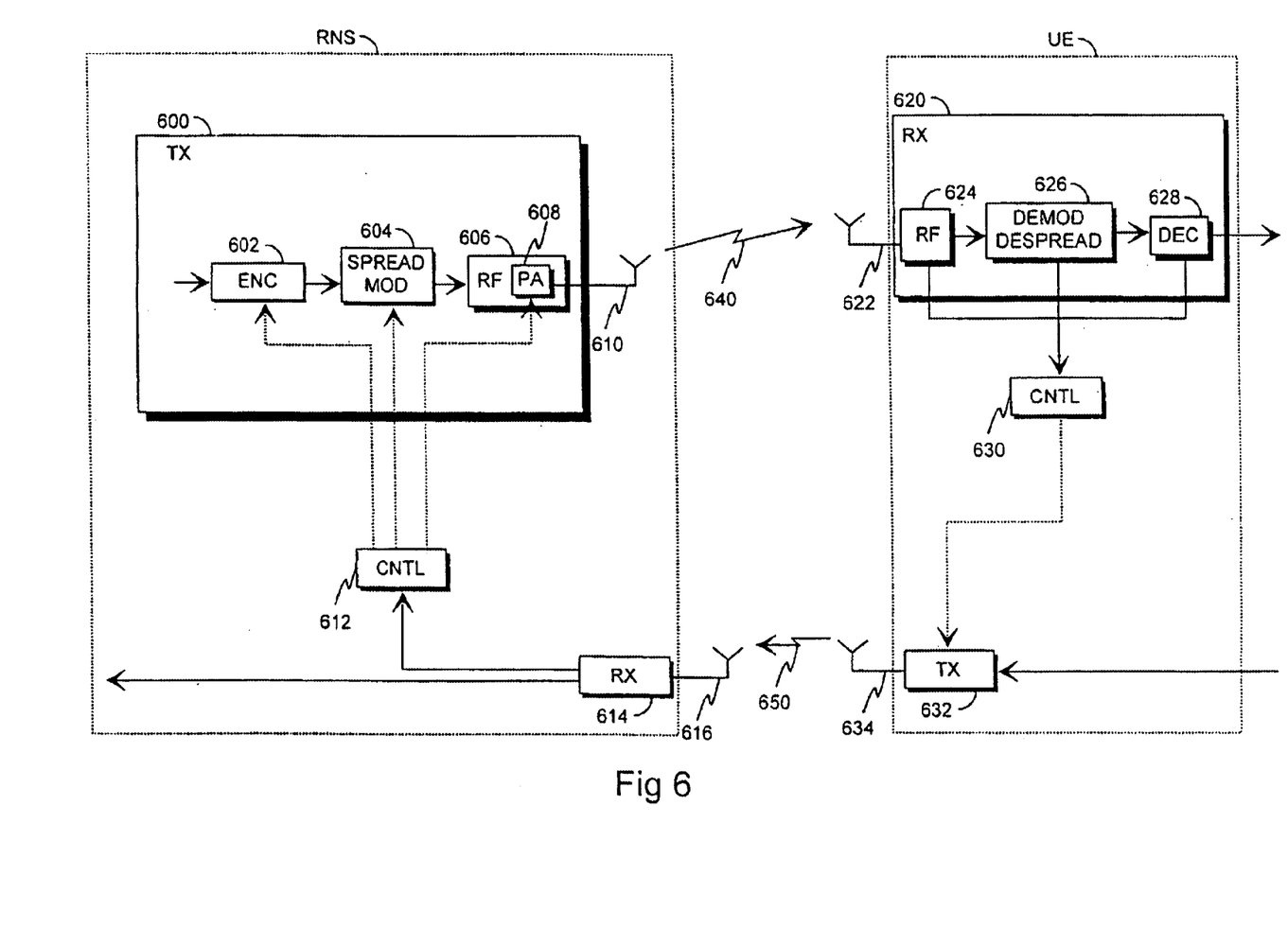
FIG. 6 shows the structure of a radio system and mobile station of the invention.

FIG. 6 describes the parts essential for the invention in a radio network subsystem RNS and user equipment UE. A control part 612 of a radio transmitter 600 processes various control channels and services of the system located in a physical channel, such as speech, data, moving or still video image. Different services require different source coding means, for instance speech requires a speech codec. For clarity's sake, the source coding means are, however, not shown in FIG. 6.

In a channel coder 602, the information transmitted through the physical channel is channel-coded, in which convolution coding and its different variations, such as turbo coding, are typically used. Channel coding also includes various block codes, such as the CRC check (cyclic redundancy check) and the Reed-Solomon code.

Interleaving is not shown in FIG. 6. The purpose of interleaving is to facilitate error correction. In interleaving, the bits of the signal are scrambled in a certain manner among themselves, after which a momentary fade on the radio path does not necessarily yet make the transmitted information unidentifiable.

The signal is spread with a spreading code and modulated in block 604. The information transmitted in the service is multiplied by a spreading code, whereby a relatively narrowband information is spread to a wide frequency band. Each link Uu has its own spreading code by which the receiver identifies transmissions meant for it. The pulse format of the spread signal can be filtered, after which the signal is modulated to a radio frequency carrier by multiplying it with the carrier. The obtained signal is then ready to be transmitted to the radio path Uu, excluding any possible filtering and power amplification.

The modulated signal is forwarded to radio frequency parts 606 which comprise a power amplifier 608 The radio frequency parts 606 can also comprise filters limiting bandwidth. An analogue radio signal 640 is then transmitted to the radio path Uu through an antenna 610.

The radio receiver 620 is typically a Rake receiver. An analogue radio frequency signal 640 is received from the radio path Uu with an antenna 622. The signal 640 is forwarded to radio frequency parts 624 comprising a filter which prevents all frequencies outside the desired frequency band. After this, the signal is converted in a demodulator 626 to an intermediate frequency or directly to a base band, and the thus converted signal is then sampled and quantized.

As the signal in question is a multi-path propagated signal, the aim is to combine the multi-path propagated signal components in block 626 which comprises several Rake fingers according to prior art. Delays are searched for each multi-path propagated signal component in a rowing Rake finger. When the delays have been found, different Rake fingers are allocated to receive each its own multi-path propagated signal component. During reception, the received signal component is correlated with the used spreading code which has been delayed by the delay found for the multi-path in question. The different demodulated and de-spread multi-path propagated components of the same signal are combined to produce a stronger signal.

Next, the signal is forwarded to a channel decoder 628 in which the channel coding, for instance block coding and convolution coding, used in the transmission is decoded. Convolution coding is preferably decoded with a Viterbi decoder. The thus obtained originally transmitted information is then forwarded to user equipment UE for further processing.

In block 630, a quality value of the received signal is measured, such as that of the inter-frequency measurement during gaps in compressed mode. The reception level, bit error ratio, SINR ratio (signal/interference+noise ratio), SIR ratio (signal/interference ratio), C/I ratio (carrier/interference ratio) or any other known way of measuring the channel quality.

The user equipment UE also comprises a transmitter 632 and an antenna 634 which have their counterparts, a receiver 614 and an antenna 616, in the radio network subsystem RNS for receiving the analogue messages 650 transmitted by the user equipment UE. The transmitter 632 and receiver 614 are in structure similar to the transmitter 600 and receiver 620 described above.

The above description of the radio network subsystem RNS and user equipment UE corresponds to the structure of the UMTS mobile telephone system. The invention can be implemented in all corresponding wireless telecommunications systems in which total transmission power control is required to distribute uplink and downlink transmissions of terminals and interference evenly with respect to time and which comprise the means essential for the implementation of the invention. Thus, the invention can be applied to various wireless local area networks WLAN, Internet protocol-based wireless networks or satellite systems, for instance. It is essential for the present invention that in the radio system of FIG. 6, the radio network subsystem RNS comprises control means 612 for defining measurement patterns for terminals, the measurement patterns setting the locations of the gaps used for measurements in the time-slot frame and the control means 612 also defining different delays for the measurement patterns of said terminals so that the gaps of different terminals are substantially at different locations in the time-slot frame. In addition, the radio system, preferably its base station should comprise a transmitter 600 for transmitting the measurement patterns to the corresponding terminals. It is essential for the terminal of the invention that it comprises a receiver 620 for receiving the measurement pattern definitions transmitted by the fixed network, and processing means 630 for arranging the gaps into the time-slot frame according to the measurement pattern definitions and for adapting the delay according to the measurement pattern definitions for the measurement pattern.

The invention is preferably implemented by software, whereby in the radio network subsystem RNS, a microprocessor is as in FIG. 1, for instance, arranged to the base station B, or alternatively to the control means (118, 112) of the radio network controller RNC, in which microprocessor the measurement pattern and delay definitions are made. The control means 118 of FIG. 1 thus correspond to the control means 612 of FIG. 6. Naturally, the invention can also be implemented by hardware providing the necessary functionality, for instance ASIC (application specific integrated circuit) or a separate logic. The necessary parameters can advantageously be defined on the basis of an algorithm or lookup table configured for the purpose.

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for defining measurement gaps in a wireless telecommunications system comprising at least one base station and several wireless terminals, the method comprising the steps of:

defining for the wireless terminals in the telecommunications system measurement patterns which define locations of gaps used for measurements in a time-slot frame, sending the measurement patterns to corresponding wireless terminals through the base station, wherein various terminal-specific delays are defined for the measurement patterns of the wireless terminals so that the gaps of different terminals are in substantially different locations in the time-slot frame.

2. A method as claimed in claim 1, further comprising the step of defining the measurement patterns at least by means of a gap length and a gap pattern length and the various terminal-specific delays of measurement patterns by means of a frame number and a time-slot number.

3. The method according to claim 2 wherein the step of defining for the wireless terminals in the telecommunications system further comprises the step of defining for the wireless terminal in a compressed mode of a frequency division duplex wideband code division multiple access system measurement patterns which define location of gaps used for measurements in a time-slot frame.

4. A method as claimed in claim 3, further comprising the step of performing measurements of inter-frequencies of the system during the gaps.

5. A method as claimed in claim 1, further comprising the step of defining the measurement patterns and their terminal-specific delays by software in a fixed network on the basis of an algorithm or lookup table configured for defining the measurement patterns and their terminal-specific delays.

6. A wireless telecommunications system comprising:

at least one base station and several wireless terminals;

means for defining measurement patterns for the terminals, which measurement patterns define locations of gaps used for measurements in a time-slot frame, and which base station comprises a transmitter for transmitting the measurement patterns to a corresponding wireless terminal, wherein the means for defining the measurement patterns are arranged to define various terminal specific delays for the measurement patterns of the terminals so that the gaps of different terminals are in substantially different locations of the time-slot frame.

7. A telecommunications system as claimed in claim 6, wherein the measurement patterns are arranged to be defined at least by means of a gap length and a gap pattern length and the various terminal-specific delays of measurement patterns by means of a frame number and a time-slot number.

8. A telecommunications system as claimed in claim 7, wherein the telecommunications system is a frequency division duplex wideband code division multiple access system having a compressed mode during which measurement pattern definitions and terminal-specific delay definitions are arranged to be made.

9. A telecommunications system as claimed in claim 8, wherein the terminals are arranged to perform measurements of inter-frequencies of the system during the gaps.

10. A telecommunications system as claimed in claim 6, wherein the means for defining the measurement patterns comprises an algorithm or lookup table configured by software.

11. A terminal in a wireless telecommunications system comprising:

a receiver for receiving measurements pattern definitions made by the telecommunications system; and processing means for arranging gaps in a time-slot frame according to the measurement pattern definitions, wherein the processing means are also arranged to set for the measurement pattern definition a delay according to the measurement pattern definitions.

12. A terminal as claimed in claim 11, wherein the processing means are arranged to set the measurement pattern definition into the time-slot frame at least by means of a gap length and a gap pattern length and the measurement pattern delay by means of a frame number and a time-slot number.

13. A terminal as claimed in claim 12, wherein the terminal is a frequency division duplex wideband code division multiple access system, which is arranged to perform measurements of inter-frequencies of the system in a compressed mode during the gaps.

14. A base station in a wireless telecommunications system, to which means for defining measurement patterns for terminals are operationally connected, the measurement patterns setting locations of gaps used for measurements in a time-slot frame and the base station comprising a transmitter for transmitting the measurement patterns to the terminals, wherein the means for defining the measurement patterns, operationally connected to the base station, are arranged to define various delays for the measurement patterns of the terminals so that the gaps of different terminals are in substantially different locations in the time-slot frame.

15. A base station as claimed in claim 14, wherein the means for defining measurement patterns comprises an algorithm or lookup table configured by software.

* * * * *